US012257500B2

United States Patent
Roberts-Hoffman et al.

(10) Patent No.: US 12,257,500 B2
(45) Date of Patent: Mar. 25, 2025

(54) AUTOMATED FRAME PACING BASED ON GAMEPLAY STATE

(71) Applicant: Google LLC, Mountain View, CA (US)

(72) Inventors: Katie Leah Roberts-Hoffman, Mountain View, CA (US); Scott James Carbon-Ogden, London (GB)

(73) Assignee: Google LLC, Mountain View, CA (US)

( * ) Notice: Subject to any disclaimer, the term of this patent is extended or adjusted under 35 U.S.C. 154(b) by 494 days.

(21) Appl. No.: 17/610,131

(22) PCT Filed: Sep. 23, 2021

(86) PCT No.: PCT/US2021/051741
§ 371 (c)(1),
(2) Date: Nov. 9, 2021

(87) PCT Pub. No.: WO2023/048716
PCT Pub. Date: Mar. 30, 2023

(65) Prior Publication Data
US 2023/0092869 A1    Mar. 23, 2023

(51) Int. Cl.
*A63F 13/52* (2014.01)
*G06T 1/20* (2006.01)

(52) U.S. Cl.
CPC .............. *A63F 13/52* (2014.09); *G06T 1/20* (2013.01)

(58) Field of Classification Search
CPC . A63F 13/52; A63F 13/77; G06T 1/20; G06F 1/3206; G06F 1/3234; G06F 1/324; G06F 9/5011
See application file for complete search history.

(56) References Cited

U.S. PATENT DOCUMENTS

| 2014/0092103 | A1 | 4/2014 | Saulters et al. |
| 2016/0328821 | A1* | 11/2016 | Hsiao .................. H04N 7/0127 |
| 2018/0246770 | A1* | 8/2018 | Yu ......................... G06F 9/5011 |
| 2019/0149637 | A1 | 5/2019 | Howell et al. |

(Continued)

FOREIGN PATENT DOCUMENTS

| CN | 105045367 A | 11/2015 | |
| CN | 108646906 A | * 10/2018 | ........... G06F 1/3265 |

(Continued)

OTHER PUBLICATIONS

Office Action, and translation thereof, from counterpart Japanese Application No. 2022-506518 dated Nov. 28, 2023, 7 pp.

(Continued)

*Primary Examiner* — Steven J Hylinski
(74) *Attorney, Agent, or Firm* — Shumaker & Sieffert, P.A.

(57) ABSTRACT

A computing device may determine one or more characteristics of a gaming application executing at one or more processors of the computing device. The computing device may determine a gameplay state of the gaming application executing at the one or more processors based at least in part on the one or more characteristics. The computing device may adjust, based at least in part on the state of the gaming application, a target frame rate of image data outputted by the gaming application for display at a display device. The computing device may output, based at least in part on the adjusted target frame rate, the image data for display at the display device.

19 Claims, 4 Drawing Sheets

(56) References Cited

U.S. PATENT DOCUMENTS

| | | |
|---|---|---|
| 2019/0342425 A1 | 11/2019 | Cheng et al. |
| 2019/0371037 A1 | 12/2019 | Xie |
| 2019/0391898 A1 | 12/2019 | Vichare et al. |
| 2020/0230499 A1 | 7/2020 | Buser et al. |

FOREIGN PATENT DOCUMENTS

| | | | | |
|---|---|---|---|---|
| CN | 108733193 A | * | 11/2018 | ........... G06F 1/3206 |
| CN | 109771949 A | * | 5/2019 | |
| CN | 112230758 A | * | 1/2021 | ........... G06F 1/3265 |
| CN | 112587920 A | | 4/2021 | |
| CN | 113117326 A | * | 7/2021 | ........... A63F 13/355 |
| CN | 113347466 A | * | 9/2021 | ............ A63F 13/30 |
| CN | 114510274 A | * | 5/2022 | |
| JP | 2020099517 A | | 7/2020 | |
| JP | 2021117305 A | | 8/2021 | |
| KR | 20210051903 A | * | 5/2021 | |
| WO | 2021056478 A1 | | 4/2021 | |
| WO | WO-2021182313 A1 | * | 9/2021 | ........... H04N 19/142 |

OTHER PUBLICATIONS

Dietich et al., "Estimating the Limits of CPU Power Management for Mobile Games", , 2017 IEEE International Conference on Computer Design (ICCD), IEEE, Nov. 5, 2017, pp. 1-8.

Dietrich et al., "Lightweight graphics instrumentation for game state-specific power management in Android", Multimedia Systems, vol. 20, No. 05, May 8, 2014, pp. 563-578.

Invitation to Pay Additional Fees and, Where Applicable, Protest Fee from International Application No. PCT/US2021/051741, dated Jun. 14, 2022, 13 pp.

Qi et al., "VGRIS: Virtualized GPU Resource Isolation and Scheduling in Cloud Gaming", ACM Transactions on Architecture and Code Optimization, vol. 11, No. 2, Jul. 15, 2014, pp. 1-25.

Nikitis, "Improving Performance Using Unity Profiler", I am a newbie developer, Oct. 4, 2020, 21 pp., Machine translation provided, URL: https://dev-nicitis.tistory.com/7.

Office Action from counterpart Korean Application No. 10-2022-7004635 dated Feb. 15, 2024, 14 pp.

International Search Report and Written Opinion of International Application No. PCT/US2021/051741 dated Aug. 5, 2022, 19 pp.

Decision of Rejection, and translation thereof, from counterpart Japanese Application No. 2022-506518 dated Apr. 16, 2024, 4 pp.

International Preliminary Report on Patentability from International Application No. PCT/US2021/051741 dated Apr. 4, 2024, 14 pp.

Office Action, and translation thereof, from counterpart Korean Application No. 10-2022-7004635 dated Oct. 28, 2024, 17 pp.

Response to Decision of Rejection, and machine translation thereof, dated Apr. 16, 2024, from counterpart Japanese Application No. 2022-506518 filed Aug. 14, 2024, 35 pp.

Office Action, and machine translation thereof, from counterpart Japanese Application No. 2022-506518 dated Oct. 8, 2024, 4 pp.

Response to Communication Pursuant to Rules 161(1) and 162 EPC dated Aug. 17, 2022, from counterpart European Application No. 21798195.0, filed Feb. 15, 2023, 23 pp.

Response to Office Action dated Oct. 28, 2024, and translation thereof, from counterpart Korean Application No. 10-2022-7004635 filed Dec. 23, 2024, 50 pp.

Response to Office Action dated Oct. 8, 2024, and translation thereof, from counterpart Japanese Application No. 2022-506518 filed Jan. 7, 2025, 14 pp.

Notice of Intent to Grant, and translation thereof, from counterpart Korean Application No. 10-2022-7004635 dated Jan. 8, 2025, 4 pp.

Communication pursuant to Article 94(3) EPC from counterpart European Application No. 21798195.0 dated Jan. 15, 2025, 65 pp.

* cited by examiner

AUTOMATED FRAME PACING BASED ON GAMEPLAY STATE

BACKGROUND

The frame rate at which a gaming application outputs image data may affect the perceived smoothness of the image data outputted by the gaming application, and may enable users playing a game in the gaming application to more quickly take action to provide user input during gameplay. As such, certain gaming applications may, during execution at a computing device, attempt to output image data at as high of a frame rate as possible that is able to be rendered and outputted by the computing device. To enable a gaming application to output image data at such high frame rates, one or more processors of the computing device may operate at a sustained high operating clock speed during execution of the gaming application. Such sustained operations of the one or more processors at high operating clock speeds may increase the heat dissipated by the one or more processors, thereby increasing the temperature within the physical enclosure of the computing device. The increased heat dissipation by the one or more processors may eventually cause the computing device to exceed its thermal requirements, thereby causing the one or more processors to reduce their operating clock speeds and potentially reducing the frame rate at which the gaming application is able to output image data. The sustained operations of the one or more processors at high operating clock speeds may also cause the computing device to drain its battery power more quickly.

SUMMARY

In general, techniques of this disclosure are directed to determining the gameplay state of a gaming application executing at a computing device and adjusting a target frame rate of image data outputted by the gaming application based on the gameplay state. The computing device may determine the gameplay state of the gaming application without receiving explicit indications of the gameplay state of the gaming application. Instead, the computing device may determine, based on one or more characteristics associated with the gaming application during execution, the gameplay state of the gaming application.

The computing device adjusts the target frame rate of image data outputted by the gaming application based on the gameplay state of the gaming application. Specifically, when the gaming application is in a gaming state, the computing device may set the target frame rate of the image data being outputted by the gaming application to a relatively high frame rate, and one or more processors of the computing device may operate at a sustained high operating clock speed during execution of the gaming application. When the gaming application transitions from the gaming state to the non-gaming state, the computing device may reduce the target frame rate of the image data outputted by the gaming application, and the one or more processors of the computing device may operate at a relatively lower operating clock speed, thereby reducing battery drain and reducing the amount of heat dissipated by one or more processors of the computing device during execution of the gaming application.

In one example, this disclosure describes a method includes determining, by one or more processors of a computing device, one or more characteristics of a gaming application executing at the one or more processors; determining, by the one or more processors, a gameplay state of the gaming application executing at the one or more processors based at least in part on the one or more characteristics; adjusting, by the one or more processors and based at least in part on the state of the gaming application, a target frame rate of image data outputted by the gaming application for display at a display device; and outputting, by the one or more processors and based at least in part on the adjusted target frame rate, the image data for display at the display device.

In another example, this disclosure describes a computing device includes memory; and one or more processors operably coupled to the memory and configured to: determine one or more characteristics of a gaming application executing at the one or more processors; determine a gameplay state of the gaming application executing at the one or more processors based at least in part on the one or more characteristics; adjust, based at least in part on the state of the gaming application, a target frame rate of image data outputted by the gaming application for display at a display device; and output, based at least in part on the adjusted target frame rate, the image data for display at the display device.

In another example, this disclosure describes a computer-readable storage medium storing instructions that, when executed, cause one or more processors of a computing device to: determine one or more characteristics of a gaming application executing at the one or more processors; determine a gameplay state of the gaming application executing at the one or more processors based at least in part on the one or more characteristics; adjust, based at least in part on the state of the gaming application, a target frame rate of image data outputted by the gaming application for display at a display device; and output, based at least in part on the adjusted target frame rate, the image data for display at the display device.

The details of one or more examples are set forth in the accompanying drawings and the description below. Other features, objects, and advantages of the disclosure will be apparent from the description and drawings, and from the claims.

DETAILED DESCRIPTION

Figure 1:
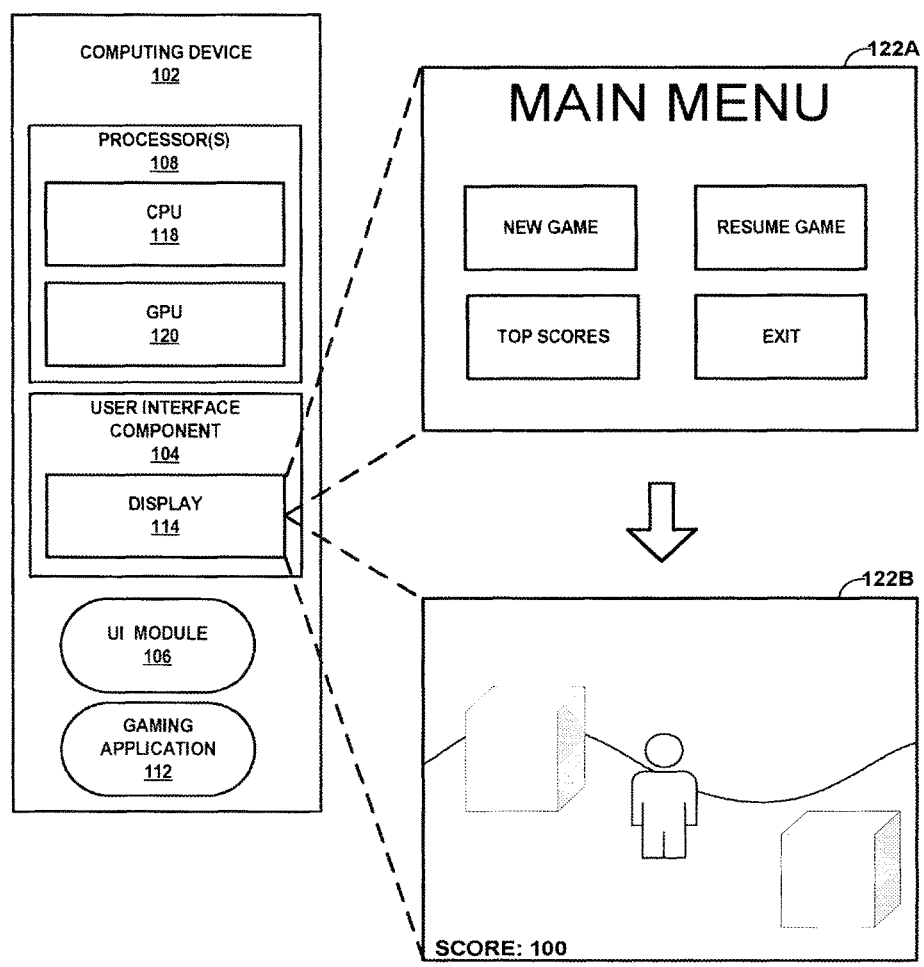
FIG. 1 is a conceptual diagram illustrating an example computing device that is configured to determine the gameplay state of a gaming application and to adjust the target frame rate of the gaming application based on the gameplay state, in accordance with one or more aspects of the present disclosure.

In general, techniques of this disclosure are directed to determining the gameplay state of a gaming application executing at a computing device and adjusting a target frame rate of image data outputted by the gaming application based on the gameplay state. The computing device may determine the gameplay state of the gaming application without receiving explicit indications of the gameplay state of the gaming application. Instead, the computing device may determine, based on one or more characteristics associated with the gaming application during execution, the gameplay state of the gaming application.

A gaming application may, during execution, transition between a gaming state and a non-gaming state. A gaming application may be in a gaming state when the gaming application is providing an interactive gameplay environment for active gameplay by the user of the computing device. Conversely, the gaming application may be in a non-gaming state when the gaming application is not providing such an interactive gameplay environment, such as when the gaming application is outputting a menu screen, is outputting a loading screen, outputting a lobby screen, etc.

When a gaming application is in a gaming state, the frame rate of image data outputted by the gaming application may affect the gameplay experience for the user of the computing device, such as the perceived smoothness of the gaming application's graphics, the amount of graphical artifacts in the image data outputted by the gaming application, the amount of input lag experienced by the user, and the like. As such, a gaming application may attempt to always output image data at as high of a frame rate as possible that is able to be rendered and outputted by the computing device while the gaining application is in the gaming state.

When a gaming application is in a non-gaming state, such as when a gaming application is outputting menus and/or loading screens, the frame rate of image data outputted by the gaming application may have little to no impact on the user experience of the user interacting with menus and/or load screens. As such, when the gaming application continues to output image data at as high of a frame rate as possible while the gaming application is in the non-gaming state, the processing resources required for sustaining such high frame rates, such as the one or more processors of the gaming application operating at high clock rates, may cause excessive battery drain and may prevent the computing device from reducing the amount of heat generated by the one or more processors.

In accordance with aspects of the present disclosure, a computing device may, during execution, determine the gameplay state of the gaming application and may, in response to determining the gameplay state of the gaming application, adjust the target frame rate of the gaming application based on the gameplay state of the gaming application. The computing device may be able to determine the gameplay state of the gaming application without receiving, from the gaming application, explicit indications of the gameplay state of the application. Instead, the computing device may be able to determine the gameplay state of the gaming application based on one or more characteristics associated with the gaming application during execution, such as the pattern of user inputs received during execution of the gaming application, the patterns of usage of the one or more processors of the computing device, the graphical commands issued by the gaming application during execution, the image data being outputted by the gaming application during execution, and the like.

When the computing device determines that the gaming application is in the gaming state, the computing device may set the target frame rate to a relatively high target frame rate, thereby enabling the gaming application to provide a high quality gameplay experience for the user. When the computing device determines that the gaming application is in the non-gaming state, the computing device may set the target frame rate to a relatively low target frame rate, thereby enabling the computing device to reduce the amount of heat generated by the one or more processors and reducing the battery drain caused by the one or more processors.

The techniques of this disclosure provides one or more technical advantages. By determining the gameplay state of a gaming application, the techniques of this disclosure may enable a computing device to adaptively decrease the frame rate of image data being outputted the gaming application to output image data while the gaming application is in the non-gaming state, thereby enabling the computing device to reduce battery drain and reduce the amount of heat dissipated by one or more processors of the computing device during execution of the gaming application by decreasing the operating clock speeds of the one or more processors of the computing device.

Reducing the battery drain of the computing device may, in cases where the computing device is a mobile computing device, increase the battery life of the computing device. Furthermore, reducing the amount of heat dissipated by one or more processors of the computing device while the gaming application is in the non-gaming state increases the available thermal headroom of the computing device for later increasing the operating clock speeds of the one or more processors to support increasing the target frame rate of image data outputted by the computing device when the computing device transitions to the gaming state.

FIG. 1 is a conceptual diagram illustrating an example computing device that is configured to determine the gameplay state of a gaming application and to adjust the target frame rate of the gaming application based on the gameplay state, in accordance with one or more aspects of the present disclosure. In the example of FIG. 1, computing device 102 may include, but is not limited to, portable or mobile devices such as mobile phones (including smart phones), laptop computers, tablet computers, wearable computing devices such as smart watches or computerized eyewear, smart television platforms, cameras, personal digital assistants (PDAs), etc. In some examples, computing device 102 may include stationary computing devices such as desktop computers, servers, mainframes, etc.

As shown in FIG. 1, computing device 102 includes user interface component 104 ("UIC 104") user interface module 106 ("UI module 106"), and gaming application 112. UI module 106 and gaming application 112 may perform operations described herein using software, hardware, firmware, or a mixture of both hardware, software, and firmware residing in and executing on computing device 102 or at one or more other remote computing devices. In some examples, UI module 106 and gaming application 112 may be implemented as hardware, software, and/or a combination of hardware and software. Computing device 102 may execute module 106 and gaming application 112 with one or more processors 108. Computing device 102 may execute any of module 106 and gaming application 112 as or within a virtual machine executing on underlying hardware. UI module 106 and gaming application 112 may be implemented in various ways. For example, any of module 106 and/or gaming application 112 may be implemented as a downloadable or pre-installed application or "app." In another example, any of module 106 and gaming application 112 may be implemented as part of an operating system of computing device 102. Other examples of computing device 102 that implement techniques of this disclosure may include additional components not shown in FIG. 1.

One or more processors 108 may implement functionality and/or execute instructions within computing device 102. For example, one or more processors 108 may receive and execute instructions that provide the functionality of UI module 106 and gaming application 112 to perform one or more operations. That is, UI module 106 and gaming application 112 may be operable by processors 40 to perform various functions described herein. In the example of FIG. 1, one or more processors include central processing unit (CPU) 118 and graphics processing unit (GPU) 120. GPU 120 may be a processing unit configured to configured to perform graphics related functions, such as to generate and output graphics data for presentation on a display, as well as to perform non-graphics related functions that exploit the massive processing parallelism provided by GPU 120. Examples of CPU 118 and GPU 12.0 include, but are not limited to, a digital signal processor (DSP), a general purpose microprocessor, application specific integrated circuit (ASIC), field programmable logic array (FPGA), or other equivalent integrated or discrete logic circuitry.

UIC 104 of computing device 102 may function as an input device for computing device 102 and as an output device. For instance, UIC 104 may function as an input device using a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UIC 104 may function as an output device using any one or more of a liquid crystal display (LCD), dot matrix display, light emitting diode (LED) display, microLED, organic light-emitting diode (OLED) display, e-ink, or similar monochrome or color display capable of outputting visible information to the user of computing device 102. For example, UIC 104 includes display 114.

In some examples, display 114 may be a presence-sensitive screen that may receive tactile user input from a user of computing device 102, MC 104 may receive the tactile user input by detecting one or more taps and/or gestures from a user of computing device 102 (e.g., the user touching or pointing to one or more locations of UIC 104 with a finger or a stylus pen). The presence-sensitive screen of UIC 104 may present output to a user. UIC 104 may present the output as a user interface, which may be related to functionality provided by computing device 102. For example, UIC 104 may present various functions and applications executing on computing device 102 such as an electronic message application, a messaging application, a map application, etc.

UI module 106 may be implemented in various ways. For example, UI module 106 may be implemented as a downloadable or pre-installed application or "app." In another example, UI module 106 may be implemented as part of a hardware unit of computing device 102. In another example, UI module 106 may be implemented as part of an operating system of computing device 102. In some instances, portions of the functionality of UI module 106 or any other module described in this disclosure may be implemented across any combination of an application, hardware unit, and operating system.

UI module 106 may interpret inputs detected at UIC 104 (e.g., as a user provides one or more gestures at a location of UIC 104 at which user interface 14A or another example user interface is displayed). UI module 106 may relay information about the inputs detected at UIC 104 to one or more associated platforms, operating systems, applications, and/or services executing at computing device 102 to cause computing device 102 to perform a function. UI module 106 may also receive information and instructions from one or more associated platforms, operating systems, applications, and/or services executing at computing device 102 (e.g., gaming application 112) for generating a graphical user interface (GUI). In addition, module 106 may act as an intermediary between the one or more associated platforms, operating systems, applications, and/or services executing at computing device 102 and various output devices of computing device 102 (e.g., speakers, LED indicators, vibrators, etc.) to produce output (e.g., graphical, audible, tactile, etc.) with computing device 102.

In the example of FIG. 1, computing device 102 includes gaming application 112 that executes at one or more processors 108 to perform the functionality of a video game. Although shown as operable by computing device 102, gaming application 112 may, in some examples, be operable by a remote computing device that is communicatively coupled to computing device 102. In such examples, a gaming application executing at a remote computing device may cause the remote computing device to send the content and intent information using any suitable form of data communication (e.g., wired or wireless network, short-range wireless communication such as Near Field Communication or Bluetooth, etc.). In some examples, a remote computing device may be a computing device that is separate from computing device 102.

In some examples, gaming application 112 may be an action game that may emphasize hand-eye coordination and reaction time, such as a first-person shooter game, a battle royale game, etc. In some examples, gaming application 112 may be a simulation game, such as a motorsports simulation game, an airplane simulation game, a trucking simulation game, and the like. In other examples, gaming application 112 may be a role playing game (e.g., a massive multiplayer role playing game), a networked multi-player game, a single player game, and the like.

As gaming application 112 executes at one or more processors 108, gaming application 112 may output image data for display at display 114. Image data, in some examples, may be frames of graphics that gaming application 112 outputs for display at display 114 during execution of gaming application 112. For example, the image data may include frames of graphics of the interactive gameplay environment, frames of graphics of loading screens, frames of graphics of menu screens, and the like.

Gaming application 112 may output image data at a specified frame rate, such as a specified frames per second (fps). The frame rate of the image data outputted by gaming application 112 may be the rate at which gaming application 112 outputs frames of graphics. Examples of the frame rate at which gaming application 112 outputs image data may include 5 fps, 10 fps, 30 fps, 60 fps, 120 fps, 144 fps, and the like.

Computing device 102 may specify a target frame rate for the image data outputted by gaming application 112. That is, computing device 102 may indicate a target frame rate, such as 60 fps, to gaming application 112, and gaming application 112 may attempt to output image data at the specified target frame rate for display at display 114. Computing device 102 may adjust the frame rate of the image data being outputted by gaming application 112 by adjusting the target frame rate for the image data being outputted by gaming application 112. Gaming application 112 may, in response to the target frame rate being adjusted, attempt to output image data at the adjusted target frame rate. For example, computing device 102 may increase the target frame rate for the image data being outputted by gaming application 112 to increase the frame rate at which gaming application 112 outputs image data, or computing device 102 may decrease the target frame rate for the image data being outputted by gaming application to decrease the frame rate at which gaming application 112 outputs image data.

As gaming application 112 executes at one or more processors 108, gaming application 112 may be in one of a plurality of states, and gaming application 112 may transition between the plurality of gameplay states during execution at one or more processors 108. Specifically, gaming application 112 may be in one of: a gaming state or a non-gaming state, and may transition between the gaming state and the non-gaming state during execution at one or more processors 108.

Gaming application 112 may be in a gaming state when gaming application 112 is providing an interactive gameplay environment for active gameplay by the user of computing device 102. That is, when gaming application 112 is in the gaming state, gaming application 112 enables the user of computing device 102 to actively provide user input at UIC 104 to play a game in the interactive gameplay environment, such as by providing user input at UIC 104 in an attempt to complete a level of the game, to achieve a high score, to beat a final boss, to beat an opponent at the game, to cooperate with other players to complete a goal (e.g., a quest), to simulate operating a motor vehicle, and the like.

Gaming application 112 may be in a non-gaming state when gaming application 112 is not providing an interactive gameplay environment for active gameplay by the user of the computing device. For example, gaming application 112 may be in the non-gaming state when gaming application 112 is outputting a menu screen of gaming application 112, when gaming application 112 is outputting a loading screen, such as a loading screen during loading of a next level of the game, when gaming application 112 is outputting a lobby screen or a waiting room screen during matchmaking of players, and the like. A menu screen may be a GUI outputted by gaming application 112, such as the GUI for a main menu of gaming application 112, that includes one or more UI controls such as buttons, menus, and the like, that enables the user to, in some examples, quit the game, resume a currently saved game, start a new game, view the high scores for the game, adjust settings for the game, and the like. A loading screen may be a GUI outputted by gaming application 112 while gaming application 112 is loading a next level of the game, while gaming application is saving the current state of the game, while gaming application 112 is loading the menu screen, and the like. A lobby screen or a waiting room screen may be a GUI outputted by gaming application 112 while gaming application 112 is performing matchmaking of players across a network. In some examples, gaming application 112 may be in the non-gaming state when gaming application 112 outputting any other image data besides image data of an interactive gameplay environment for active gameplay by the user of computing device 102.

Gaming application 112 may not explicitly indicate the current gameplay state of gaming application 112 to the operating system of computing device 102. That is, when gaming application 112 is in a non-gaming state, gaming application 112 may not provide an explicit indication that gaming application 112 is in the non-gaming state to the operating system of computing device 102. Similarly, when gaming application 112 is in a gaming state, gaming application 112 may not provide an explicit indication that gaming application 112 is in the gaming state to the operating system of computing device 102.

As such, in accordance with aspects of the present disclosure, computing device 102 may determine the gameplay state of gaming application 112 without receiving, from gaming application 112, explicit indications of the gameplay state of gaming application 112. Instead, as gaming application 112 executes at one or more processors 108, computing device 102 may determine one or more characteristics associated with gaming application 112 and may determine the gameplay state of gaming application 112 based at least in part on the one or more characteristics.

The one or more characteristics associated with gaming application 112 executing at one or more processors 108 may include any characteristics and/or behaviors of computing device 102 that is as a result of gaming application 112 executing at one or more processors 108 besides explicit indications of the gameplay state of gaming application 112 received from gaming application 112. Specifically, the one or more characteristics may include characteristics of components of computing device 102 that are indicative of differences in behavior of gaming application 112 and/or computing device 102 while gaming application 112 is in different gameplay states.

In some examples, the one or more characteristics may include one or more of: patterns of usage of one or more processors 108 by gaming application 112 during execution, the graphical rendering commands invoked by gaming application 112 during execution, the pattern of inputs received at UIC 104 during execution of gaming application 112, the characteristics of the image data outputted for display at display 114 by gaming application 112 during execution, information generated by profiling gaming application 112 during execution of gaming application 112, and/or patterns of network traffic sent and received by computing device 102 during execution of gaming application 112. Computing device 102 may determine, based at least in part on the one or more characteristics associated with gaming application 112, the gameplay state of gaming application 112. As discussed above, computing device 102 may determine the gameplay state of gaming application 112 without the operating system of computing device 102 receiving, from gaming application 112, explicit indications of the gameplay state of gaming application 112.

In some examples, computing device 102 may implement and use one or more neural networks trained via machine learning to determine, based on the one or more characteristics associated with gaming application 112 the gameplay state of gaming application 112. In general, one or more neural networks implemented by computing device 102 may include multiple interconnected nodes, and each node may apply one or more functions to a set of input values that correspond to one or more features, and provide one or more corresponding output values. The one or more features may be the one or more characteristics associated with gaming application 112, and the one or more corresponding output values of one or more neural networks may be an indication of the gameplay state of gaining application 112.

The one or more corresponding output values may, in some examples, include probabilities of the gameplay state of gaming application 112. Accordingly, computing device 102 may use one or more neural networks to determine probabilities of gaming application 112 being in each of the plurality of gameplay states. Computing device 102 may therefore determine the gameplay state of gaming application 112 having the highest probability of being the gameplay state of gaming application 112 as the gameplay state of gaming application.

In some examples, the one or more corresponding output values may include a confidence score associated with each of the gameplay states of gaming applications 112. Accordingly, computing device 102 may use one or more neural networks to determine a respective confidence score of gaming application 112 being in each of a plurality of gameplay states based on the one or more characteristics. Computing device 102 may therefore determine the gameplay state of gaming application 112 having the highest confidence score of being the gameplay state of gaming application 112 as the gameplay state of gaming application.

Computing device 102 may adjust a targeted frame rate of image data being outputted by gaming application 112 for display at display 114 based at least in part on the determined gameplay state of gaming application 112. Computing device 102 may associate different target frame rates with different gameplay states of gaming application 112. That is, computing device may associate a non-gaming target frame rate with the non-gaming state of gaming application 112 and may associate a gaming target frame rate with the gaming state of gaming application 112. In general, a gaming target frame rate may be greater than a non-gaming target frame rate, as a lower target frame rate during the non-gaming state may not negatively affect the user experience of interacting with gaming application 112 during the non-gaming state compared with the user experience of interacting with gaming application 112 during the gaming state.

Computing device 102 may adjust the frame rate of image data being outputted by gaming application 112 for display at display 114 based at least in part on the determined gameplay state of gaming application 112 so that the frame rate of image data being outputted by gaming application 112 for display at display 114 matches the target frame rate associated with the determined gameplay state of gaining application 112. If the frame rate of image data being outputted by gaming application 112 is below the targeted frame rate, computing device 102 may enable gaming application 112 to increase the frame rate of image data being outputted by gaming application 112 to match the target frame rate. If the frame rate of image data being outputted by gaming application 112 is above the targeted frame rate, computing device 102 may enable gaming application 112 to decrease the frame rate of image data being outputted by gaming application 112 to match the target frame rate.

If computing device 102 determines that gaming application 112 is in the gaming state, computing device 102 may adjust the frame rate of image data being outputted by gaming application 112 to match the gaming target frame rate associated with the gaming state of gaming application 112. Similarly, if computing device 102 determines that gaming application 112 is in the non-gaming state, computing device 102 may adjust the frame rate of image data being outputted by gaming application 112 to match the non-gaming target frame rate associated with the non-gaming state of gaming application 112.

To adjust the frame rate of image data being outputted by gaming application 112, computing device 102 may send an indication of the target frame rate to gaming application 112 to enable gaming application 112 to increase or decrease the frame rate of image data being outputted by gaming application 112 to match the target frame rate. Computing device 102 may also adjust the respective clock speeds of CPU 118 and/or GPU 120 to enable adjusting the frame rate of image data being outputted by gaming application 112 to match the target frame rate. For example, to increase the frame rate of image data being outputted by gaming application 112 to match the target frame rate, computing device 102 may increase the respective clock speeds of CPU 118 and/or GPU 120. Similarly, to decrease the frame rate of image data being outputted by gaming application 112 to match the target frame rate, computing device 102 may decrease the respective clock speeds of CPU 118 and/or GPU 120.

In some examples, to adjust the frame rate of image data being outputted by gaming application 112, computing device 102 may also adjust the panel refresh rate of display 114. For example, to adjust the frame rate of image data being outputted by gaming application 112 to match a target frame rate, computing device 102 may set the panel refresh rate of display 114 to match the target frame rate.

Computing device 102 may, while gaming application 112 executes at one or more processors 108, periodically determine one or more characteristics associated with gaming application 112 and adjust the frame rate of image data being outputted by gaming application 112 based on the one or more characteristics. Computing device 102 may not necessarily perform such determination and adjustment at the same rate as the frame rate of image data being outputted by gaming application 112. Instead, computing device 102 may perform such determination of the gameplay state of gaming application 112 and adjustment of the target frame rate of gaming application 112 multiple times a second, such as ten times a second, fifteen times a second, twenty times a second, and the like.

In the example of FIG. 1, when gaming application 112 is outputting GUI 122A of a menu screen, gaming application 112 may be in a non-gaming state. Computing device 102, as gaming application 112 executes at one or more processors 108 to output GUI 122A of a menu screen, may determine one or more characteristics associated with gaming application 112 executing at one or more processors 108, and may determine, based on the one or more characteristics associated with gaming application 112 executing at one or more processors 108, that gaming application 112 is in a non-gaming state. Computing device 102 may therefore adjust the target frame rate of image data being outputted by gaming application 112 based on the gameplay state of gaming application 112 being in a non-gaming state, such as by setting the target frame rate to a relatively low frame rate, such as 5 fps.

Gaming application 112 may transition from the non-gaming state to the non-gaming state by executing at one or more processors 108 to output GUI 122B of an interactive gameplay environment for active gameplay by the user of computing device 102. Computing device 102, as gaming application 112 executes at one or more processors 108 to output GUI 122B, may determine one or more characteristics associated with gaming application 112 executing at one or more processors 108, and may determine, based on the one or more characteristics associated with gaming application 112 executing at one or more processors 108, that gaming application 112 has transitioned from the non-gaming state to a gaming state. Computing device 102 may therefore adjust the target frame rate of image data being outputted by gaming application 112 based on the gameplay state of gaming application 112 being in a gaming state, such as by increasing the target frame rate from the previously adjusted target frame rate of 5 fps to a relatively high frame rate, such as 144 fps.

Figure 2:
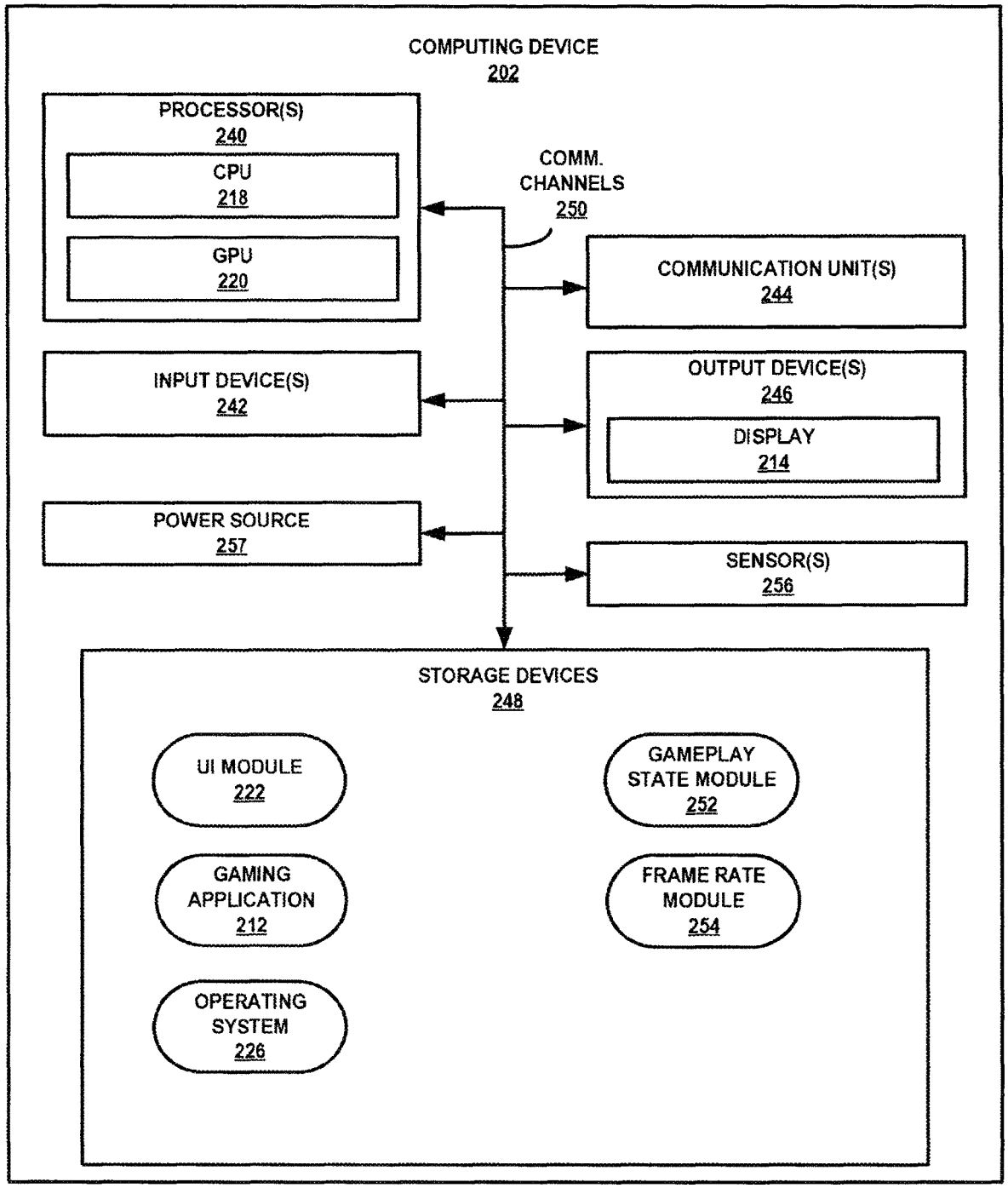
FIG. 2 is a block diagram illustrating an example computing device, in accordance with one or more aspects of the present disclosure.

FIG. 2 is a block diagram illustrating an example computing device, in accordance with one or more aspects of the present disclosure. FIG. 2 illustrates only one particular example of computing device 102, and many other examples of computing device 102 may be used in other instances and may include a subset of the components included in example computing device 102 or may include additional components not shown in FIG. 2.

As shown in the example of FIG. 2, computing device 202 includes one or more processors 240, one or more input devices 242, one or more communication units 244, one or more output devices 246, one or more storage devices 248, and one or more sensors 256. One or more processors 240 may be an example of one or more processors 108 of FIG. 1. One or more input devices 242 and one or more output device 246 may be examples of UIC 104 of FIG. 1. Storage devices 248 of computing device 202 also include UT module 222, gaming application 212, operating system 226, gameplay state module 252, and frame rate module 254. Communication channels 250 may interconnect each of the components 240, 242, 244, 246, 248, and 256 for inter-component communications (physically, communicatively, and/or operatively). In some examples, communication channels 250 may include a system bus, a network connection, one or more inter-process communication data structures, or any other components for communicating data between hardware and/or software.

One or more processors 240 may implement functionality and/or execute instructions within computing device 202. For example, processors 240 on computing device 102 may receive and execute instructions stored by storage devices 248 that provide the functionality of UI module 222, gaming application 212, operating system 226, gameplay state module 252, and frame rate module 254. These instructions executed by processors 240 may cause computing device 202 to store and/or modify information, within storage devices 48 during program execution. Processors 240 may execute instructions of UI module 222, gaming application 212, operating system 226, gameplay state module 252, and frame rate module 254. That is, UT module 222, gaming application 212, operating system 226, gameplay state module 252, and frame rate module 254 may be operable by processors 240 to perform various functions described herein.

One or more processors 240 may include CPU 218 and GPU 220. GPU 220 may be a processing unit configured to configured to perform graphics related functions, such as to generate and output graphics data for presentation on a display, as well as to perform non-graphics related functions that exploit the massive processing parallelism provided by CPU 220. Examples of CPU 218 and CPU 220 include, but are not limited to, a digital signal processor (DSP), a general purpose microprocessor, application specific integrated circuit (ASIC), field programmable logic array (FPGA), or other equivalent integrated or discrete logic circuitry.

One or more input devices 242 of computing device 202 may receive input. Examples of input are tactile, audio, kinetic, and optical input, to name only a few examples. Input devices 242 of computing device 202, in one example, include a mouse, keyboard, voice responsive system, video camera, buttons, control pad, microphone or any other type of device for detecting input from a human or machine. In some examples, input device 242 may be a presence-sensitive input device, which may include a presence-sensitive screen, touch-sensitive screen, etc.

One or more output devices 246 of computing device 102 may generate output. Examples of output are tactile, audio, and video output. Output devices 46 of computing device 202, in one example, include a presence-sensitive screen, such as display 214, sound card, video graphics adapter card, speaker, cathode ray tube (CRT) monitor, liquid crystal display (LCD), or any other type of device for generating output to a human or machine. Output devices 246 may include display 214, such as cathode ray tube (CRT) monitor, liquid crystal display (LCD), Light-Emitting Diode (LED) or any other type of device for generating tactile, audio, and/or visual output.

One or more communication units 244 of computing device 202 may communicate with external devices by transmitting and/or receiving data. For example, computing device 202 may use communication units 244 to transmit and/or receive radio signals on a radio network such as a cellular radio network. In some examples, communication units 244 may transmit and/or receive satellite signals on a satellite network such as a Global Positioning System (GPS) network. Examples of communication units 244 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers and the like.

One or more storage devices 248 within computing device 202 may store information for processing during operation of computing device 202. In some examples, storage device 248 is a temporary memory, meaning that a primary purpose of storage device 248 is not long-term storage. Storage devices 248 on computing device 202 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 248, in some examples, also include one or more computer-readable storage media. Storage devices 248 may be configured to store larger amounts of information than volatile memory. Storage devices 248 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or data associated with UI module 222, which may be an example of UI module 106 of FIG. 1, gaming application 212, which may be an example of gaming application 112 of FIG. 1, operating system 226, gameplay state module 252, and frame rate module 254.

As shown in FIG. 2, computing device 102 may include one or more sensors 256. Sensors 256 may include an accelerometer that generates accelerometer data. Accelerometer data may indicate an acceleration and/or a change in acceleration of computing device 202. Sensors 256 may include a gyroscope that generates gyroscope data. Gyroscope data may indicate a physical orientation and/or change in physical orientation of computing device 102. In some examples, the orientation may be relative to one or more reference points. Sensors 256 may include a magnetometer that generates magnetometer data. Magnetometer data may indicate the magnetization of an object that is touching or in proximity to computing device 202. Magnetometer data may indicate the Earth's magnetic field, and in some examples, provide directional functionality of a compass. Sensors 256 may include an ambient light sensor that generates ambient light data. The ambient light data may indicate an intensity of light to which computing device 202 is exposed. Sensors 256 may include a proximity sensor that generates proximity data. Proximity data may indicate whether an object is within proximity to computing device 202. In some examples, proximity data may indicate how close an object is to computing device 202. In some examples, sensors 256 may include a clock that generates a date and time. The date and time may be a current date and time.

As shown in FIG. 2, computing device 102 may include a power source 257. In some examples, power source 257 may be a battery. Power source 257 may provide power to one or more components of computing device 202. Examples of power source 257 may include, but are not necessarily limited to, batteries having zinc-carbon, lead-acid, nickel cadmium (NiCd), nickel metal hydride (NAM), lithium ion (Li-ion), and/or lithium ion polymer (Li-ion polymer) chemistries. In some examples, power source 257 may have a limited capacity (e.g., 1000-4000 mAh).

In accordance with techniques of the disclosure, one or more processors 240 of computing device 202 are configured to execute gameplay state module 252 to determine the gameplay state of gaming application 212 as gaming application 212 executes at one or more processors 240. Gameplay state module 252 may be able to determine the gameplay state of gaming application 212 without receiving, from gaming application 212, an explicit indication of the gameplay state of gaming application 212. Instead, gameplay state module 252 may determine the gameplay state of gaming application 212 as gaming application 212 executes at one or more processors 240 based on one or more characteristics associated with gaming application 212 executing at one or more processors 240. One or more processors 240 may periodically execute gameplay state module 252 to determine the current gameplay state of gaming application 212 as gaming application 212 executes at one or more processors 240. For example, one or more processors 240 may execute gameplay state module 252 to determine the current gameplay state of gaming application 212 five times a second, ten times a second, and the like.

Gaming application 212 executes at one or more processors 240 to perform the functionality of a video game. In some examples, gaming application 212 may be an action game that may emphasize hand-eye coordination and reaction time, such as a first-person shooter game, a battle royale game, etc. In some examples, gaming application 212 may be a simulation game, such as a motorsports simulation game, an airplane simulation game, a trucking simulation game, and the like. In other examples, gaming application 212 may be a role playing game (e.g., a massive multiplayer role playing game), a networked multi-player game, a single player game, and the like.

As gaming application 212 executes at one or more processors 240, gaming application 212 may output image data for display at display 214. Image data, in some examples, may be frames of graphics that gaming application 212 outputs for display at display 214 during execution of gaming application 212. For example, the image data may include frames of graphics of the interactive gameplay environment, frames of graphics of loading screens, frames of graphics of menu screens, and the like.

As gaming application 212 executes at one or more processors 240, gaming application 212 may be in one of a plurality of states, and gaming application 212 may transition between the plurality of gameplay states during execution at one or more processors 240. Specifically, gaming application 212 may be in one of: a gaming state or a non-gaming state, and may transition between the gaming state and the non-gaming state during execution at one or more processors 240.

Gaming application 212 may be in a gaming state when gaming application 212 is providing an interactive gameplay environment for active gameplay by the user of computing device 202. That is, when gaming application 212 is in the gaming state, gaming application 212 enables the user of computing device 202 to actively provide user input at one or more input devices 242 to play a game in the interactive gameplay environment, such as by providing user input at one or more input devices 242 in an attempt to complete a level of the game, to achieve a high score, to beat a final boss, to beat an opponent at the game, to cooperate with other players to complete a goal (e.g., a quest), to simulate operating a motor vehicle, and the like.

Gaming application 212 may be in a non-gaming state when gaming application 212 is not providing an interactive gameplay environment for active gameplay by the user of the computing device. For example, gaming application 212 may be in the non-gaming state when gaming application 212 is outputting a menu screen of gaming application 212 or when gaming application 212 is outputting a loading screen, such as a loading screen during loading of a next level of the game. A menu screen may be a GUI outputted by gaming application 212, such as the GUI for a main menu of gaming application 212, that includes one or more UI controls such as buttons, menus, and the like, that enables the user to, in some examples, quit the game, resume a currently saved game, start a new game, view the high scores for the game, adjust settings for the game, and the like. A loading scree may be a GUI outputted by gaming application 212 while gaming application 212 is loading a next level of the game, while gaming application is saving the current state of the game, while gaming application 212 is loading the menu screen, and the like. In some examples, gaming application 212 may be in the non-gaming state when gaming application 212 outputting any other image data besides image data of an interactive gameplay environment for active gameplay by the user of computing device 202.

The one or more characteristics associated with gaming application 212 executing at one or more processors 240 may include any characteristics and/or behaviors of the components of computing device 202 that may be indicative of differences in the behavior of gaming application 212 and/or components of computing device 202 while gaming application 212 is in different gameplay states. In some examples, the one or more characteristics may include patterns of usage of one or more processors 240 by gaming application 212 during execution, such as patterns of usage of CPU 218 and GPU 220 by gaming application 212. In some examples, the usage of CPU 218 and GPU 220 may be relatively higher when a gaming application, such as gaming application 212, is in the gaming state and may be relatively lower when the gaming application is in the non-gaming state. As such, the pattern of usage of one or more processors 240 by gaming application 212 during execution may be indicative of the gameplay state of gaming application 212, and the patterns of usage of one or more processors 240 included as the one or more characteristics may include the amount of usage of CPU 218 and/or the amount of usage of GPU 220 during execution of gaming application 212.

In some examples, the one or more characteristics may include the patterns of one or more graphical rendering commands invoked by gaming application 212 during execution. Examples of such graphical rendering commands may include OpenGL commands, DirectX commands, Metal commands, commands sent through a cross-platform graphics engine abstraction layer such as Almost Native Graphics Layer Engine (ANGLE), and the like. In some instances, a gaming application, such as gaming application 212, may invoke a relatively greater variety of different graphical rendering commands and use a relatively greater number of different shaders while the gaming application is in the gaming state compared with the gaming application in the non-gaming state. In some instances, a gaming application may also invoke a relatively greater amount of three-dimensional graphical rendering commands while in the gaming state compared with the gaming application in the non-gaming state, and the graphical application may invoke a greater amount of two-dimensional graphical rendering commands while in the non-gaming state compared with the gaming application in the gaming state. Thus, the pattern of one or more graphical rendering commands invoked by gaming application 212 included in the one or more characteristics may include the variety of different graphical rendering commands invoked by gaming application 212, the types of graphical rendering commands invoked by gaming application 212, the number and type of different shaders used during execution of gaming application 212, and the like.

In some examples, the one or more characteristics may include pattern of inputs received at one or more input devices 242 during execution of gaming application 212. Typically, a user using a gaming application may provide user input at a greater frequency during gameplay (i.e., when the gaming application is in the gaming state) compared with while the gaming application is displaying a menu or a loading screen (i.e., when the gaming application is in the non-gaming state). Further, if computing device 202 is a mobile computing device comprising a presence-sensitive display, the user may provide user input in the form of touch and hold gestures (e.g., long press gestures) at a greater frequency while the gaming application is in the gaming state compared with while the gaming application in the non-gaming state.

As such, computing device 202 may, during execution of gaming application 212, more frequently receive user input at one or more input devices 242 while gaming application 212 is in the gaming state compared with the frequency of user input received while gaming application 212 is in the non-gaming state. Similarly, computing device 202 may, during execution of gaming application 212, more frequently receive user input in the form of touch and hold gestures while gaming application 212 is in the gaming state compared with the frequency of user input in the form of touch and hold gestures received by computing device 202 while gaming application 212 is in the non-gaming state. As such, the one or more characteristics may include indications of the frequency of user inputs received by computing device 202 during execution of gaming application 212 and indications of the frequency of touch and hold gestures received by computing device 202 during execution of gaming application 212.

In some examples, the one or more characteristics may include image data outputted for display at display 214 by gaming application 212 during execution. Image data outputted by, gaming application 212 for display at display 214 that is relatively stable may be indicative of gaming application 212 outputting a menu screen and thus gaming application 212 being in the non-gaming state, while image data outputted by gaming application 212 for display at display 214 that frequently changes from one frame to another may be indicative of gaming application 212 being in the gaming state.

As such, the one or more characteristics may include indications of the amount of change between frames of image data outputted by gaming application 212. For example, gameplay state module 252 may determine, based on frames of image data outputted by gaming application 212, a histogram of image data, such as a histogram that counts the amount of times consecutive frames of image data outputted by gaming application 212 are unchanged and the amount of times consecutive frames of image data outputted by gaming application 212 are different.

In some examples, the one or more characteristics may include information generated by profiling gaming application 212 during execution of gaming application 212 gameplay state module 252 may perform profiling of gaming application 212 may analyzing the call stack of gaming application 212, GPU counters. The information generated by profiling gaming application 212 may include patterns between reasonably consistent work by gaming application 212, which may be indicative of gaming application 212 being in the gaming state, and inconsistent work by gaming application 212, which may be indicative of gaming application 212 in the non-gaming state.

In some examples, the one or more characteristics may include patterns of network traffic sent and received by computing device 202 during execution of gaming application 212. If a gaming application is a network-based multiplayer game, gameplay state module 252 may analyze the patterns of the network traffic and/or inspect the network packets sent and received by computing device 102 to determine whether gaming application 212 is in a gaming state or a non-gaming state.

For example, gameplay state module 252 may perform stateful packet inspection to determine whether the network packets sent and received by computing device 202 during execution of gaming application 212 include matchmaking information, active gameplay information, and the like. If gameplay state module 252 determines that the network packets include matchmaking information, gameplay state module 252 may determine that gaming application 212 is in the non-gaming state. If gameplay state module 252 determines that the network packets include active gameplay information, such as the locations of different players within the map of the game, the health levels of different players, the amount of loot collected by each of the players, and the like, gameplay state module 252 may determine that gaming application 212 is in the non-gaming state.

In some examples, the consistency of the network traffic sent and received by computing device 202 during execution of gaming application 212 may be indicative of the gameplay state of gaining application 212. Specifically, sudden but consistent network traffic may be indicative of gaming application 212 entering the gaming state, while sporadic and/or inconsistent network traffic may be indicative of gaming application 212 being in the non-gaming state. As such, the consistency of the network traffic sent and received by computing device 202 during execution of gaming application 212 may be included in the one or more characteristics that are indicate of whether gaming application 212 is in the gaming state or in the non-gaming state.

Gameplay state module 252 may execute at one or more processors 240 to determine, based at least in part on the one or more characteristics associated with gaming application 212, the gameplay state of gaming application 212. As discussed above, gameplay state module 252 may determine the gameplay state of gaming application 212 without receiving, such as from gaming application 212, explicit indications of the gameplay state of gaming application 212.

In some examples, gameplay state module 252 may implement and use one or more neural networks trained via machine learning to determine, based on the one or more characteristics associated with gaming application 212 the gameplay state of gaming application 212. In general, one or more neural networks implemented by gameplay state module 252 may include multiple interconnected nodes, and each node may apply one or more functions to a set of input values that correspond to one or more features, and provide one or more corresponding output values. The one or more features may be the one or more characteristics associated with gaming application 212, and the one or more corresponding output values of one or more neural networks may be an indication of the gameplay state of gaming application 212.

In some examples, the one or more neural networks of gameplay state module 252 are trained to determine, based on one or more characteristics associated with a gaming application, the gameplay state of the gaming application. The one or more neural networks may perform such machine learning using training data that includes sets of characteristics associated with a gameplay state to learn connections between characteristics and gameplay states. In some examples, the one or more networks may be trained off-device (e.g., at an external computing system) and then installed and/or downloaded at computing device 202. In some examples, the one or more neural networks may be trained on-device at computing device 202.

The one or more corresponding output values may, in some examples, include probabilities of the gaming application 212 being in each of the plurality of gameplay states. Accordingly, gameplay state module 252 may implement one or more neural networks to determine probabilities of the gameplay state of gaming application 212 based on the one or more characteristics, and may determine and output an indication of the gameplay state of gaming application 212 having the highest probability of being the gameplay state of gaming application 212 based on the corresponding probabilities.

In some examples, the one or more corresponding output values of the one or more neural networks may include a respective confidence score for each of the plurality of gameplay states. Accordingly, gameplay state module 252 may implement one or more neural networks to determine a confidence score for gaming application 212 being in a gaming state and a confidence score for gaming application 212 being in a non-gaming state. As such, in some examples, gameplay state module 252 may determine the gameplay state of gaming application 212 to be the gaming state associated with the highest confidence score.

In some examples, gameplay state module 252 may use a combination of two or more models to determine, based on the one or more characteristics of gaming application 212 executing at one or more processors 240, the gameplay state of gaming application 212. For example, gameplay state module 252 may use a first model to determine, using a single characteristic, such as the patterns of user input received during execution of gaming applications 212, the probability of gaming application 212 being in the gaming state. In some examples, the first model may include one or more neural networks trained via machine learning, as described above, to take, as input, the patterns of user input received during execution of gaming application 212 to determine the probability of gaming application 212 being in the gaming state.

In some examples, the first model may utilize a user input frequency threshold. In these examples, gameplay state module 252 may compare the frequency of user input received during execution of gaming applications 212 against the user input frequency threshold to determine whether gaming application 212 is likely to be in the gaming state. For example, if gameplay state module 252 determines that the frequency of user input received during execution of gaming application 212 exceeds the input frequency threshold, gameplay state module 252 may determine that gaming application 212 is likely to be in the gaming state.

If gameplay state module 252 determines, based on the first model, that the gaming application is not likely to be in the gaming state, such as if the probability of gaming application 212 being in the gaming state as determined using the first model does not exceed a threshold likelihood percentage (e.g., 50%), gameplay state module 252 may determine that gaming application 212 is in the non-gaming state. Similarly, if gameplay state module 252 determines, based on the first model, that the gaming application is likely to be in the gaming state, such as if the probability of gaming application 212 being in the gaming state as determined using the first model exceed a threshold likelihood percentage (e.g., 50%), gameplay state module 252 may use a second model that takes the additional one or more characteristics associated with gaming application 212 as input to output the probability and/or confidence of gaming application 212 being in the gaming state. Gameplay state module 252 may therefore determine, based on the output of the second model, the gameplay state of gaming application 212.

One or more processors 240 of computing device 202 are configured to execute frame rate module 254 to adjust, based at least in part on the gameplay state of gaming application 212, the target frame rate for the image data outputted by gaming application 212. A target frame rate for gaming application 212 may be a frame rate that gaming application 212 attempts to match when outputting image data. For example, if the target frame rate for the image data outputted by gaming application 212 is 30 fps, gaming application 212 may attempt to output image data at 30 fps. If frame rate module 254 adjusts the target frame rate for the image data outputted by gaming application 212 from 30 fps to 45 fps, gaming application 212 may attempt to increase the frame rate at which it outputs image data from 30 fps to 45 fps.

Different gameplay states of gaming application 212 may be associated with different target frame rates. For example, a gaming target frame rate associated with the gaming state of gaming application 212 may typically be higher than a non-gaming target frame rate associated with the non-gaming state of gaming application 212 Examples of the gaming target frame rate may include 60 fps, 120 fps, 144 fps, and the like, while examples of non-gaming target frame rate may include 5 fps, 10 fps, 20 fps, 30 fps, and the like. In some examples, the gaming target frame rate may depend on the panel refresh rate of display 214. For example, the gaming target frame rate may not exceed the panel refresh rate of display 214. Thus, if the panel refresh rate of display 214 is 144 Hertz, the gaming target frame rate may not exceed 144 fps.

In some examples, frame rate module 254 may adjust the target frame rate for the image data outputted by gaming application 212 by setting the target frame rate for the image data outputted by gaming application 212 to the target frame rate associated with the gameplay state of gaming application 212 determined by gameplay state module 252. That is, if gameplay state module 252 determines that the gameplay state of gaming application 212 is the gaming state, frame rate module 254 may set the target frame rate for the image data outputted by gaming application 212 to the gaming target frame rate associated with the gameplay state of gaming application 212. Similarly, if gameplay state module 252 determines that the gameplay state of gaming application 212 is the non-gaming state, frame rate module 254 may set the target frame rate for the image data outputted by gaming application 212 to the non-gaming target frame rate associated with the non-gaming state of gaming application 212.

The target frame rate for the image data outputted by gaming application 212 may be specific to gaming application 212. That is, the target frame rate for the image data outputted by gaming application 212 may be different from the target frame rate for image data outputted by other applications. Similarly, the gaming target frame rate and the non-gaming target frame rate for the image data outputted by gaming application 212 may be specific to gaming application 212 and may be different from the gaming target frame rate and the non-gaming target frame rate for image data outputted by other applications.

In some examples, the target frame rate for the image data outputted by gaming application 212 may also be specific to computing device 202 and/or one or more processors 240 at which gaming application 212 executes. That is, the gaming target frame rate and the non-gaming target frame rate for the image data outputted by gaming application 212 may be specific to computing device 202 and/or the one or more processors 240, and may be different from the gaming target frame rate and the non-gaming target frame rate for the image data outputted by the same gaming application that executes at a different computing device. For example, when gaming application 212 transitions from a non-gaming state to a gaming state, frame rate module 25 4 may determine a gaming target frame rate associated with the gameplay state of gaming application 212 that is specific to computing device 202, and may set the target frame rate of the image data being outputted by gaming application 212 to the gaming target frame rate.

In some examples, frame rate module 254 may adjust the target frame rate for the image data outputted by gaming application 212 by profiling gaming application 212 during execution at one or more processors 240. For example, frame rate module 254 may determine the frame rate at which gaming application 212 outputs image data during execution, such as when gaming application 212 is in the gaming state, and may determine the target frame rate associated based on the frame rate at which gaming application 212 outputs image data during previous execution.

In some examples, frame rate module 254 may determine, based on profiling gaming application 212 during execution at one or more processors 240, determine the proportion of time spent by gaming application 212 in the non-gaming state and the proportion of time spent by gaming application 212 in the gaming state. Frame rate module 254 may also determine, based on the profiling of gaming application 212, the frequency in which gaming application 212 is in the non-gaming state versus the frequency in which gaming application 212 is in the gaming state (e.g., the ratio of time between the gaming application 212 being in the non-gaming state and in the gaming state).

One or more processors 240 may typically operate at a much lower clock speed while gaming application 212 is in a non-gaming state versus being in the gaming state because the non-gaming target frame rate for gaming application 212 may be relatively much lower than the gaming target frame rate for gaming application 212. As such, being in the non-gaming state enables computing device 202 allows computing device 202 to recover from the high internal temperature caused by one or more processors 240 operating at a high clock speed during the gaming state. Thus, the ratio of time between the gaming application 212 being in the non-gaming state and in the gaming state may correspond to the dock speed at which one or more processors 240 may operate while gaming application 212 is in the gaming state.

For example, if gaming application 212 frequently spends relatively long periods of time in non-gaming state versus being in gaming state, the frequent and long periods of time in non-gaming state enables one or more processors 240 to operate at a low clock speed for a relatively long period of time, thereby enabling long recover periods from high internal temperature caused by one or more processors 240 operating at a high clock speed during the gaming state. As such, the internal temperature of the enclosure of computing device 202 may be relatively low when gaming application 212 transitions from non-gaming state to gaming state, thereby enabling frame rate module 254 to increase the clock speeds of one or more processors 240 to a relatively higher operating frequency compared with a gaming application having relatively less frequent and shorter periods of time in non-gaming state versus being in gaming state.

For example, if frame rate module 254 determines that gaming application 212, while in the gaming state, outputs image data at a certain frame rate without causing computing device 202 to exceed computing device 202's thermal requirements (e.g., the internal temperature within computing device 202's enclosure is below a specified threshold temperature), frame rate module 254 may determine the gameplay target frame rate associated with the gaming state based on the certain frame rate at which gaming application 212 outputs image data in the gaming state during previous execution of gaming application 212. For example, frame rate module 254 may set the gameplay target frame rate associated with the gaming state to the certain frame rate at which gaming application 212 outputs image data in the gaming state during previous execution of gaming application 212.

In some examples, frame rate module 254 may determine the target frame rate for the image data outputted by gaming application 212 based at least in part on the fidelity settings associated with the image data outputted by gaming application 212. The fidelity settings associated with the image data may be associated the level of detail of the graphics in the image data outputted by gaming application 212, the resolution of the image data outputted by gaming application 212, and the like.

Gaming application 212 may require higher processing resources to output, at a specified frame rate, image data at a relatively higher fidelity setting compared with outputting, at the same specified frame rate, image data at a relatively lower fidelity setting. Due to factors such as the thermal requirements of computing device 202, the processing power of one or more processors 240, the amount of power available in power source 257, gaming application 212 may sometimes be unable to output image data at a relatively higher fidelity at the same frame rate as image data at a relatively lower fidelity. As such, in some examples, frame rate module 254 may, when gaming application 212 transitions from a non-gaming state to a gaming state, adjust the target frame rate to a gaming target frame rate that is associated with the fidelity settings associated with gaming application 212, where the gaming target frame rate associated with a relatively higher fidelity setting may be of a lower frame rate than the gaming target frame rate associated with a relatively lower fidelity setting.

Frame rate module 254 may, in response to determining the adjusted target frame rate, send an indication of the adjusted target frame rate to gaming application 212. Gaming application 212 may therefore output image data based at least in part on the adjusted target frame. In some examples, gaming application 212 may output image data based on the adjusted target frame rate by setting the frame rate of image data outputted by gaming application 212 to the target frame rate. That is, gaming application 212 may attempt to output image data at a frame rate that matches the adjusted target frame rate, such as by increasing or decreasing the rate at which gaming application 212 outputs image data to output image data at a frame rate that matches the adjusted target frame rate.

In some examples, to enable gaming application 212 to output image data at a frame rate that matches the adjusted target frame rate, frame rate module 254 may adjust, based at least in part on the gameplay state of gaming application 212, a respective clock speed of at least one of: CPU 218 or GPU 220 of the one or more processors 240. For example, if frame rate module 254 adjusts the target frame rate by increasing the target frame rate, frame rate module 254 may increase the respective clock speed of at least one of: CPU 218 or GPU 220 of the one or more processors 240. As such, if gameplay state module 252 determines that gaming application 212 is transitioning from a non-gaming state to a gaming state, frame rate module 254 may increase the target frame rate of image data outputted by gaming application 212 and increase the respective clock speed of at least one of: CPU 218 or GPU 220 of the one or more processors 240.

Similarly, if frame rate module 254 adjusts the target frame rate by decreasing the target frame rate, frame rate module 254 may decrease the respective clock speed of at least one of: CPU 218 or GPU 220 of the one or more processors 240. As such, if gameplay state module 252 determines that gaming application 212 is transitioning from a gaming state to a non-gaming state, frame rate module 254 may decrease the target frame rate of image data outputted by gaming application 212 and decrease the respective clock speed of at least one of: CPU 218 or GPU 220 of the one or more processors 240.

In some examples, in addition to adjusting the respective clock speed of at least one of: CPU 218 or GPU 220 of the one or more processors 240, frame rate module 254 may also adjust the refresh rate of display 214 to enable gaming application 212 to output image data based on the adjusted target frame rate. For example, frame rate module 254 may set the panel refresh rate of display 214 to the adjusted target frame rate for the image data outputted by gaming application 212.

In some examples, frame rate module 254 may determine, in response to adjusting the target frame rate of the image data outputted by gaming application 212, whether gaming application 212 is able to output image data at a frame rate that matches the adjusted target frame rate (e.g., whether the frame rate is the same as the adjusted target frame rate). Frame rate module 254 may determine that gaming application 212 is not able to output image data at a frame rate that matches the adjusted target frame rate if the maximum frame rate of image data being outputted by gaming application 212 never reaches the target frame rate and/or if gaming application 212 is unable to consistently output image data at the targeted frame rate. For example, frame rate module 254 may determine that gaming application 212 is unable to consistently output image data at the targeted frame rate if gaming application 212 is unable to output image data at the targeted frame rate for more than a threshold percentage of time, such as more than 5% of the time, more than 10% of the time, and the like. If frame rate module 254 determines that gaming application 212 is not able to output image data at a frame rate that matches the adjusted target frame rate, frame rate module 254 may take one or more actions to better enable gaming application 212 to output image data at a frame rate that matches the adjusted target frame rate.

In some examples, frame rate module 254 may, in response to determining that gaming application 212 is not able to output image data at a frame rate that matches the adjusted target frame rate, increase the respective dock speed of at least one of: CPU 218 or GPU 220 of the one or more processors 240. For example, if the adjusted target frame rate is 60 fps, and if gaming application 212 is only able to output image data at a frame rate of 55 fps, frame rate module 254 may increase the respective dock speed of at least one of: CPU 218 or GPU 220 of the one or more processors 240 in an attempt to enable gaming application 212 to output image data at a frame rate (e.g., 60 fps) that matches the adjusted target frame rate.

In some examples, frame rate module 254 may, in response to determining that gaming application 212 is not able to output image data at a frame rate that matches the adjusted target frame rate of image data outputted by gaming application 212, further adjust the target frame rate of image data outputted by gaming application 212 to a target frame rate at which gaming application 212 is able to output image data without an increase in the clock speed of one or more processors 240. That is, frame rate module 254 may, in response to increasing the target frame rate of image data outputted by gaming application 212 based on the gameplay state of gaming application 212, determine whether gaming application 212 is able to, without increasing the clock speed of one or more processors 240, output image data at a frame rate that matches the adjusted target frame rate. Frame rate module 254 may, in some instances, in response to determining that gaming application 212 is unable to output image data at a frame rate that matches the adjusted target frame rate, refrain from increasing the respective clock speeds of at least one of: CPU 218 or GPU 220 of one or more processors 240. Instead, frame rate module 254 may further adjust the target frame rate of image data outputted by gaming application 212 by decreasing the adjusted target frame rate to result in a target frame rate at which gaming application 212 is able to output image data at the current clock speeds of one or more processors 240.

For example, frame rate module 254 may determine if the thermal requirements of computing device 202 (e.g., internal temperature within the enclosure of computing device 202) would be exceeded by increasing the clock speed of one or more processors 240. If frame rate module 254 determines that increasing the clock speed of one or more processors 240 to a rate that enables gaming application 212 is able to output image data at a target frame rate may cause computing device 202 to exceed its thermal requirements, frame rate module 254 may decrease the target frame rate to enable gaming application 212 to output image data at the target frame rate without increasing the clock speed of one or more processors 240.

In some examples, frame rate module 254 may, in response to determining that gaming application 212 is not able to output image data at a frame rate that matches the adjusted target frame rate of image data outputted by gaming application 212, determine whether to increase the respective clock speeds of at least one of: CPU 218 or GPU 220 of one or more processors 240 based at least in part on the difference between the adjusted target frame rate and the frame rate (e.g., maximum frame rate) at which gaming application 212 is able to output image data at the current clock speeds of CPU 218 and GPU 220. In some examples, if frame rate module 254 determines that the difference between the adjusted target frame rate and the frame rate at which gaming application 212 is able to output image data at the current clock speeds of CPU 218 and GPU 220 is greater than a specified frame rate threshold, which may be a specified percentage of the adjusted target frame rate (e.g., 10% of the adjusted target frame rate, 20% of the adjusted target frame rate), frame rate module 254 may refrain from increase the respective clock speeds of at least one of: CPU 218 or GPU 220 of one or more processors 240. Instead, frame rate module 254 may decrease the target frame rate to correspond to the frame rate at which gaming application 212 is able to output image data at the current clock speeds of CPU 218 and GPU 220.

In some examples, frame rate module 254 may, in response to determining that gaming application 212 is not able to output image data at a frame rate that matches the adjusted target frame rate of image data outputted by gaming application 212, determine whether to increase the respective clock speeds of at least one of: CPU 218 or GPU 220 of one or more processors 240 based at least in part on the amount of power available in power source 257, such as the amount of battery power remaining in power source 257. For example, if frame rate module 254 determines that the amount of battery power remaining in power source 257 is less than a specified threshold, such as less than 20% battery power, less than 10% battery power, and the like, frame rate module 254 may refrain from increase the respective clock speeds of at least one of: CPU 218 or GPU 220 of one or more processors 240. Instead, frame rate module 254 may decrease the target frame rate to correspond to the frame rate at which gaming application 212 is able to output image data at the current clock speeds of CPU 218 and GPU 220.

Figure 3:
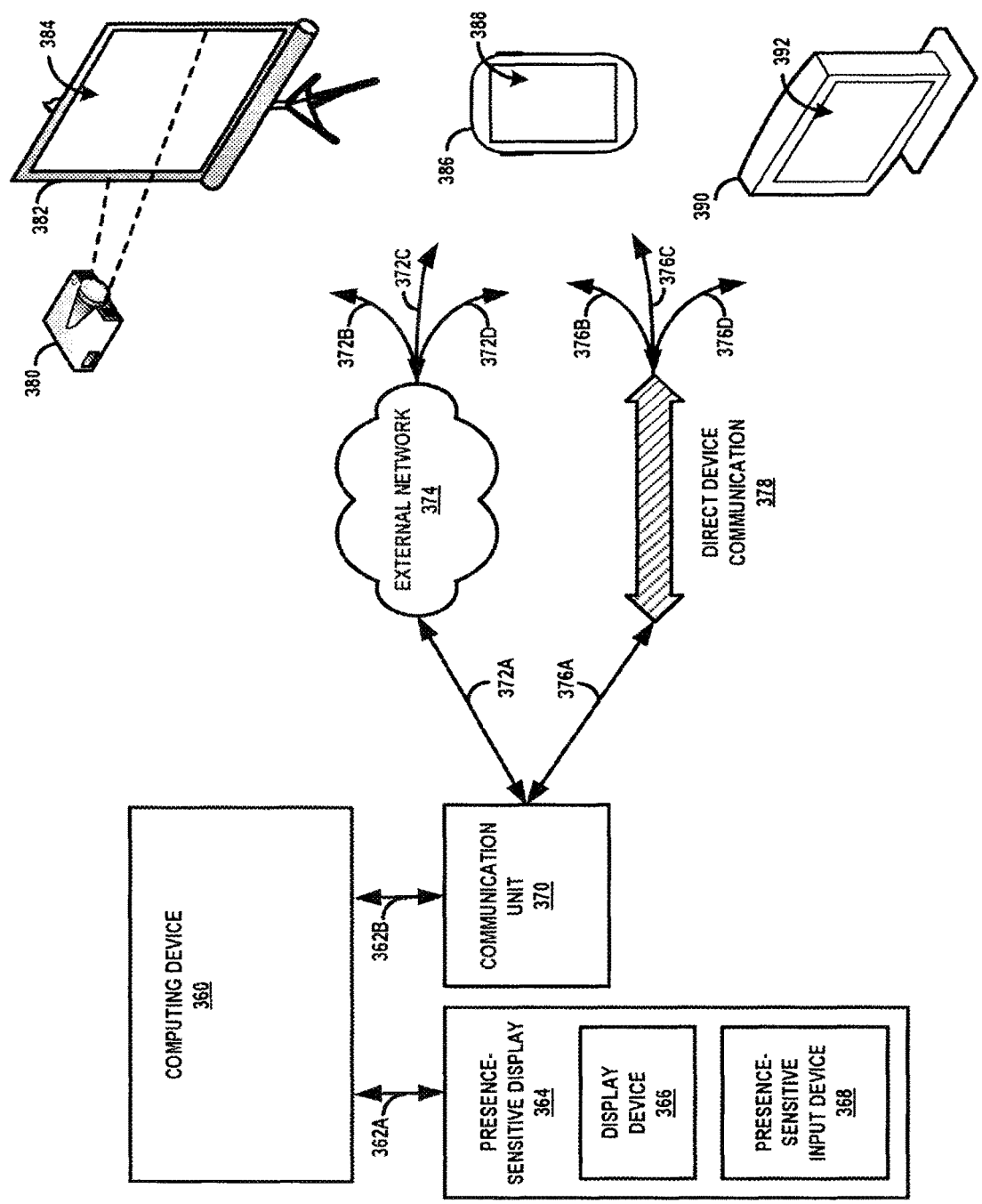
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, to name only a few examples. The example shown in FIG. 3 includes a computing device 360, a presence-sensitive display 364, communication unit 370, projector 380, projector screen 382, mobile device 386, and visual display device 390. In some examples, presence-sensitive display 364 may be an example of display 114 shown in FIG. 1 and display 214 shown in FIG. 2. Although shown for purposes of example in FIGS. 1 and 2 as a stand-alone computing device 102 and stand-alone computing device 202, a computing device such as computing device 360 may, generally, be any component or system that includes a processor or other suitable computing environment for executing software instructions and, for example, need not include a presence-sensitive display.

As shown in the example of FIG. 3, computing device 360 may be an example of computing device 102 of FIG. 1 or computing device 202 of FIG. 2, and may include a processor that includes functionality as described with respect to one or more processors 108 of FIG. 1 or one or more processors 240 of FIG. 2. In such examples, computing device 360 may be operatively coupled to presence-sensitive display 364 by a communication channel 362A, which may be a system bus or other suitable connection. Computing device 360 may also be operatively coupled to communication unit 370, further described below, by a communication channel 362B, which may also be a system bus or other suitable connection. Although shown separately as an example in FIG. 3, computing device 360 may be operatively coupled to presence-sensitive display 364 and communication unit 370 by any number of one or more communication channels.

In other examples, such as illustrated previously by computing device 102 of FIG. 1 and computing device 202 of FIG. 2, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

Presence-sensitive display 364 may include display device 366 and presence-sensitive input device 368. Display device 366 may, for example, receive data from computing device 360 and display the graphical content. In some examples, presence-sensitive input device 368 may determine one or more user inputs (e.g., continuous gestures, multi-touch gestures, single-touch gestures) at presence-sensitive display 364 using capacitive, inductive, and/or optical recognition techniques and send indications of such user input to computing device 360 using communication channel 362A. In some examples, presence-sensitive input device 368 may be physically positioned on top of display device 366 such that, when a user positions an input unit over a graphical element displayed by display device 366, the location at which presence-sensitive input device 368 corresponds to the location of display device 366 at which the graphical element is displayed.

As shown in FIG. 3, computing device 360 may also include and/or be operatively coupled with communication unit 370. Communication unit 370 may include functionality of communication unit 244 as described in FIG. 2. Examples of communication unit 370 may include a network interface card, an Ethernet card, an optical transceiver, a radio frequency transceiver, or any other type of device that can send and receive information. Other examples of such communication units may include Bluetooth, 3G, and WiFi radios. Universal Serial Bus (USB) interfaces, etc. Computing device 360 may also include and/or be operatively coupled with one or more other devices (e.g., input devices, output devices, memory, storage devices) that are not shown in FIG. 3 for purposes of brevity and illustration.

FIG. 3 also illustrates a projector 380 and projector screen 382. Other such examples of projection devices may include electronic whiteboards, holographic display devices, and any other suitable devices for displaying graphical content. Projector 380 and projector screen 382 may include one or more communication units that enable the respective devices to communicate with computing device 360. In some examples, the one or more communication units may enable communication between projector 380 and projector screen 382. Projector 380 may receive data from computing device 360 that includes graphical content. Projector 380, in response to receiving the data, may project the graphical content onto projector screen 382. In some examples, projector 380 may determine one or more user inputs (e.g., continuous gestures, multi-touch gestures, single-touch gestures) at projector screen using optical recognition or other suitable techniques and send indications of such user input using one or more communication units to computing device 360. In such examples, projector screen 382 may be unnecessary, and projector 380 may project graphical content on any suitable medium and detect one or more user inputs using optical recognition or other such suitable techniques.

Projector screen 382, in some examples, may include a presence-sensitive display 384. Presence-sensitive display 384 may include a subset of functionality or all of the functionality of presence-sensitive display 384 and/or 364 as described in this disclosure. In some examples, presence-sensitive display 384 may include additional functionality. Projector screen 382 (e.g., an electronic whiteboard), may receive data from computing device 360 and display the graphical content. In some examples, presence-sensitive display 384 may determine one or more user inputs (e.g., continuous gestures, multi-touch gestures, single-touch gestures) at projector screen 382 using capacitive, inductive, and/or optical recognition techniques and send indications of such user input using one or more communication units to computing device 360.

FIG. 3 also illustrates mobile device 386 and visual display device 390. Mobile device 386 and visual display device 390 may each include computing and connectivity capabilities. Examples of mobile device 386 may include e-reader devices, convertible notebook devices, hybrid slate devices, etc. Examples of visual display device 390 may include other semi-stationary devices such as televisions, computer monitors, etc. As shown in FIG. 3, mobile device 386 may include a presence-sensitive display 388. Visual display device 390 may include a presence-sensitive display 392. Presence-sensitive displays 388 and 392 may include a subset of functionality or all of the functionality of presence-sensitive display 384 and/or 364 as described in this disclosure. In some examples, presence-sensitive displays 388 and 392 may include additional functionality. In any case, presence-sensitive display 392, for example, may receive data from computing device 360 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to computing device 360.

As described above, in some examples, computing device 360 may output graphical content for display at presence-sensitive display 364 that is coupled to computing device 360 by a system bus or other suitable communication channel. Computing device 360 may also output graphical content for display at one or more remote devices, such as projector 380, projector screen 382, mobile device 386, and visual display device 390. For instance, computing device 360 may execute one or more instructions to generate and/or modify graphical content in accordance with techniques of the present disclosure. Computing device 360 may output the data that includes the graphical content to a communication unit of computing device 360, such as communication unit 370. Communication unit 370 may send the data to one or more of the remote devices, such as projector 380, projector screen 382, mobile device 386, and/or visual display device 390. In this way, computing device 360 may output the graphical content for display at one or more of the remote devices. In some examples, one or more of the remote devices may output the graphical content at a presence-sensitive display that is included in and/or operatively coupled to the respective remote devices.

In some examples, computing device 360 may not output graphical content at presence-sensitive display 364 that is operatively coupled to computing device 360. In other examples, computing device 360 may output graphical content for display at both a presence-sensitive display 364 that is coupled to computing device 360 by communication channel 362A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 360 and output for display at presence-sensitive display 364 may be different than graphical content display output for display at one or more remote devices.

Computing device 360 may send and receive data using any suitable communication techniques. For example, computing device 360 may be operatively coupled to external network 374 using network link 372A. Each of the remote devices illustrated in FIG. 3 may be operatively coupled to external network 374 by one of respective network links 372B, 372C, or 372D. External network 374 may include network hubs, network switches, network routers, etc., that are operatively inter-coupled thereby providing the exchange of information between computing device 360 and the remote devices illustrated in FIG. 3. In some examples, network links 372A-372D may be Ethernet, ATM or other network connections. Such connections may be wireless and/or wired connections.

In some examples, computing device 360 may be operatively coupled to one or more of the remote devices included in FIG. 3 using direct device communication 378. Direct device communication 378 may include communications through which computing device 360 sends and receives data directly with a remote device, using wired or wireless communication. That is, in some examples of direct device communication 378, data sent by computing device 360 may not be forwarded by one or more additional devices before being received at the remote device, and vice-versa. Examples of direct device communication 378 may include Bluetooth, Near-Field Communication, Universal Serial Bus, WiFi, infrared, etc. One or more of the remote devices illustrated in FIG. 3 may be operatively coupled with computing device 360 by communication links 376A-376D. In some examples, communication links 376A-376D may be connections using Bluetooth, Near-Field Communication, Universal Serial Bus, infrared, etc. Such connections may be wireless and/or wired connections.

In accordance with techniques of the disclosure, a gaming application may execute at computing device 360 and may output image data for display at presence-sensitive display 364, presence-sensitive display 384, presence-sensitive display 388, or presence-sensitive display 392. Computing device 360 may determine, based at least in part on one or more characteristics associated with the gaming application executing at computing device 360, a gameplay state of the gaming application and may adjust a target frame rate of the image data being outputted by the gaming application. The gaming application may therefore output image data for display at presence-sensitive display 364, presence-sensitive display 384, presence-sensitive display 388, or presence-sensitive display 392 based at least in part on the adjusted target frame rate.

Figure 4:
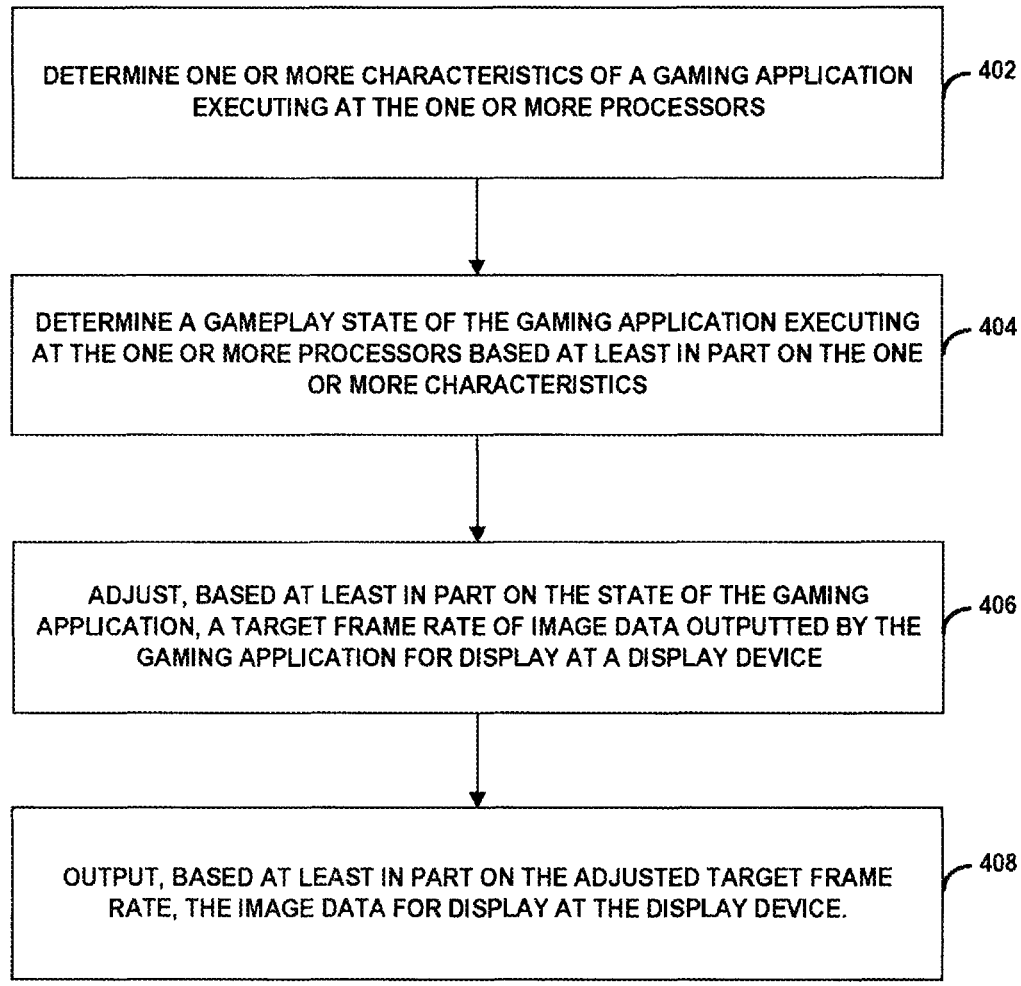
FIG. 4 is a flowchart illustrating an example mode of operation for a computing device to determine the gameplay state of a gaming application and to adjust the target frame rate of the gaming application based on the gameplay state, in accordance with one or more techniques of the present disclosure.

FIG. 4 is a flowchart illustrating an example mode of operation for a computing device to determine the gameplay state of a gaming application and to adjust the target frame rate of the gaming application based on the gameplay state, in accordance with one or more techniques of the present disclosure. FIG. 4 is described below in the context of computing device 202 of FIG. 2. As shown in FIG. 4, computing device 202 may determine one or more characteristics of a gaming application 212 executing at one or more processors 240 of the computing device 202 (402). The computing device 202 may determine a gameplay state of the gaming application 212 executing at the one or more processors 240 based at least in part on the one or more characteristics (404). The computing device 202 may adjust, based at least in part on the state of the gaming application 212, a target frame rate of image data outputted by the gaming application 212 for display at a display device 214 (406). The computing device 202 may output, based at least in part on the adjusted target frame rate, the image data for display at the display device (408).

This disclosure includes the following examples.

Example 1: A method includes determining, by one or more processors of a computing device, one or more characteristics of a gaming application executing at the one or more processors, determining, by the one or more processors, a gameplay state of the gaming application executing at the one or more processors based at least in part on the one or more characteristics; adjusting, by the one or more processors and based at least in part on the state of the gaming application, a target frame rate of image data outputted by the gaming application for display at a display device; and outputting, by the one or more processors and based at least in part on the adjusted target frame rate, the image data for display at the display device.

Example 2: The method of example 1, wherein the one or more characteristics comprise patterns of usage of the one or more processors by the gaming application during execution at the one or more processors, wherein determining the gameplay state of the gaming application further comprises: determining, by the one or more processors and based at least in part on the patterns of usage of the one or more processors by the gaming application, the gameplay state of the gaming application.

Example 3: The method of any one of examples 1 and 2, wherein the one or more characteristics comprise graphical rendering commands invoked by the gaming application during execution at the one or more processors, and wherein determining the gameplay state of the gaming application further comprises: determining, by the one or more processors and based at least in part on the graphical rendering commands invoked by the gaming application, the gameplay state of the gaming application.

Example 4: The method of any one of examples 1-4, wherein the one or more characteristics comprise a pattern of inputs received at an input device during execution of the gaming application at the one or more processors, and wherein determining the gameplay state of the gaming application further comprises: determining, by the one or more processors and based at least in part on the pattern of inputs received at an input device, the gameplay state of the gaming application.

Example 5: The method of any one of examples 1-4, wherein the one or more characteristics comprise the image data outputted for display at the display device by the gaming application, and wherein determining the gameplay state of the gaming application further comprises: determining, by the one or more processors and based at least in part on the image data outputted for display at the display device, the gameplay state of the gaming application.

Example 6: The method of any one of examples 1-5, wherein determining the gameplay state of the gaming application further comprises: determining, by the one or more processors and based at least in part on profiling the gaming application during execution of the gaming application at the one or more processors, the gameplay state of the gaming application.

Example 7: The method of any one of examples 1-6, wherein determining the gameplay state of the gaming application further comprises: determining, by the one or more processors, that the gameplay state of the gaming application is in one of: a gaming state or a non-gaming state, wherein the gaming application, in the gaming state, provides an interactive gameplay environment for active gameplay.

Example 8: The method of example 7, wherein adjusting the target frame rate of the image data further comprises: in response to determining that the gameplay state of the gaming application is in the gaming state, increasing, by the one or more processors, the target frame rate of the image data being outputted by the gaming application.

Example 9: The method of any one of examples 7 and 8, wherein adjusting the target frame rate of the image data further comprises: in response to determining that the gameplay state of the gaming application is in the non-gaming state, decreasing, by the one or more processors the target frame rate of the image data being outputted by the gaming application.

Example 10: The method of any one of examples 1-9, wherein outputting, based at least in part on the adjusted target frame rate, the image data for display at the display device further comprises: adjusting, by the one or more processors and based at least in part on the gameplay state of the gaming application, a respective clock speed of at least one of: a central processing unit (CPU) or a graphics processing unit (GPU) of the one or more processors.

Example 11: A computing device includes memory; and one or more processors operably coupled to the memory and configured to: determine one or more characteristics of a gaming application executing at the one or more processors; determine a gameplay state of the gaming application executing at the one or more processors based at least in part on the one or more characteristics; adjust, based at least in part on the state of the gaming application, a target frame rate of image data outputted by the gaming application for display at a display device; and output, based at least in part on the adjusted target frame rate, the image data for display at the display device.

Example 12: The computing device of example 11, wherein the one or more characteristics comprise patterns of usage of the one or more processors by the gaming application during execution at the one or more processors, and wherein to determine the gameplay state of the gaming application, the one or more processors are further configured to: determine, and based at least in part on the patterns of usage of the one or more processors by the gaming application, the gameplay state of the gaming application.

Example 13: The computing device of any one of examples 11 and 12, wherein the one or more characteristics comprise graphical rendering commands invoked by the gaming application during execution at the one or more processors, and wherein to determine the gameplay state of the gaming application, the one or more processors are further configured to: determine, based at least in part on the graphical rendering commands invoked by the gaming application, the gameplay state of the gaming application.

Example 14: The computing device of any one of examples 11-14, wherein the one or more characteristics comprise a pattern of inputs received at an input device during execution of the gaming application at the one or more processors, and wherein to determine the gameplay state of the gaming application, the one or more processors are further configured to: determine, based at least in part on the pattern of inputs received at an input device, the gameplay state of the gaming application.

Example 15: The computing device of any one of examples 11-14, wherein the one or more characteristics comprise the image data outputted for display at the display device by the gaming application, and wherein to determine the gameplay state of the gaming application, the one or more processors are further configured to: determine, based at least in part on the image data outputted for display at the display device, the gameplay state of the gaming application.

Example 16: The computing device of any one of examples 11-15, wherein to determine the gameplay state of the gaming application, the one or more processors are further configured to: determine, based at least in part on profiling the gaming application during execution of the gaming application at the one or more processors, the gameplay state of the gaming application.

Example 17: The computing device of any one of examples 11-16, wherein to determine the gameplay state of the gaming application, the one or more processors are further configured to: determine that the gameplay state of the gaming application is in one of: a gaming state or a non-gaming state, wherein the gaming application, in the gaming state, provides an interactive gameplay environment for active gameplay.

Example 18: The computing device of example 17, wherein to adjust the target frame rate of the image data, the one or more processors are further configured to: in response to determining that the gameplay state of the gaming application is in the gaming state, increase the target frame rate of the image data being outputted by the gaming application.

Example 19: The computing device of any one of examples 17 and 18, wherein to adjust the target frame rate of the image data, the one or more processors are further configured to: in response to determining that the gameplay state of the gaming application is in the non-gaming state, decrease the target frame rate of the image data being outputted by the gaming application.

Example 20: A computer-readable storage medium storing instructions that, when executed, cause one or more processors of a computing device to: determine one or more characteristics of a gaming application executing at the one or more processors; determine a gameplay state of the gaming application executing at the one or more processors based at least in part on the one or more characteristics; adjust, based at least in part on the state of the gaming application, a target frame rate of image data outputted by the gaming application for display at a display device; and output, based at least in part on the adjusted target frame rate, the image data for display at the display device.

Example 21: A computing device comprising means for performing the methods of any one of examples 1-10.

Example 22. A computer-readable storage medium encoded with instructions that cause one or more processors of a computing device to perform the methods of any one of examples 1-10.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
    determining, by one or more processors of a computing device, one or more characteristics of the computing device during execution of a gaming application at the one or more processors;
    determining, by the one or more processors, a gameplay state of the gaming application executing at the one or more processors based at least in part on the one or more characteristics, the gameplay state comprising a gaming state or a non-gaming state;
    determining, by the one or more processors, that, during previous execution of the gaming application, the gaming application outputted image data at a certain frame rate without an internal temperature within an enclosure of the computing device exceeding a specified threshold temperature;

adjusting, by the one or more processors and based at least in part on the gameplay state of the gaming application and on the internal temperature within the enclosure of the computing device, a target frame rate of the image data outputted by the gaming application for display at a display device, including setting, by the one or more processors, the target frame rate to the certain frame rate; and outputting, by the one or more processors and based at least in part on the adjusted target frame rate, the image data for display at the display device.

2. The method of claim 1, wherein the one or more characteristics comprise an amount of usage of the one or more processors by the gaming application during execution at the one or more processors, wherein determining the gameplay state of the gaming application further comprises:

determining, by the one or more processors and based at least in part on the amount of usage of the one or more processors by the gaming application, the gameplay state of the gaming application.

3. The method of claim 1, wherein the one or more characteristics comprise graphical rendering commands invoked by the gaming application during execution at the one or more processors, and wherein determining the gameplay state of the gaming application further comprises:

determining, by the one or more processors and based at least in part on the graphical rendering commands invoked by the gaming application, the gameplay state of the gaming application.

4. The method of claim 1, wherein the one or more characteristics comprise a pattern of inputs received at an input device during execution of the gaming application at the one or more processors, and wherein determining the gameplay state of the gaming application further comprises:

determining, by the one or more processors and based at least in part on the pattern of inputs received at an input device, the gameplay state of the gaming application.

5. The method of claim 1, wherein the one or more characteristics comprise the image data outputted for display at the display device by the gaming application, and wherein determining the gameplay state of the gaming application further comprises:

determining, by the one or more processors and based at least in part on the image data outputted for display at the display device, the gameplay state of the gaming application.

6. The method of claim 1, wherein determining the gameplay state of the gaming application further comprises:

determining, by the one or more processors, that the gameplay state of the gaming application is in one of: a gaming state or a non-gaming state, wherein the gaming application, in the gaming state, provides an interactive gameplay environment for active gameplay.

7. The method of claim 6, wherein adjusting the target frame rate of the image data further comprises:

in response to determining that the gameplay state of the gaming application is in the gaming state, increasing, by the one or more processors, the target frame rate of the image data being outputted by the gaming application.

8. The method of claim 6, wherein adjusting the target frame rate of the image data further comprises:

in response to determining that the gameplay state of the gaming application is in the non-gaming state, decreasing, by the one or more processors the target frame rate of the image data being outputted by the gaming application.

9. The method of claim 1, wherein outputting, based at least in part on the adjusted target frame rate, the image data for display at the display device further comprises:

adjusting, by the one or more processors and based at least in part on the gameplay state of the gaming application, a respective clock speed of at least one of: a central processing unit (CPU) or a graphics processing unit (GPU) of the one or more processors.

10. The method of claim 9, further comprising:

determining that the gaming application is not able to output image data at the adjusted target frame rate and, in response, determining to increase the respective clock speed;

determining that, by increasing the respective clock speed, the internal temperature would exceed a specified threshold temperature; and in response to determining that the internal temperature would exceed the specified threshold temperature by increasing the respective clock speed, decreasing, by the one or more processors, the adjusted target frame rate without increasing the respective clock speed.

11. A computing device comprising:

memory; and one or more processors operably coupled to the memory and configured to:

determine one or more characteristics of the computing device during execution of a gaming application at the one or more processors;

determine a gameplay state of the gaming application executing at the one or more processors based at least in part on the one or more characteristics, the gameplay state comprising a gaming state or a non-gaming state;

determine that, during previous execution of the gaming application, the gaming application outputted image data at a certain frame rate without an internal temperature within an enclosure of the computing device exceeding a specified threshold temperature;

adjust, based at least in part on the gameplay state of the gaming application and on the internal temperature within the enclosure of the computing device, a target frame rate of image data outputted by the gaming application for display at a display device, including setting the target frame rate to the certain frame rate; and output, based at least in part on the adjusted target frame rate, the image data for display at the display device.

12. The computing device of claim 11, wherein the one or more characteristics comprise an amount of usage of the one or more processors by the gaming application during execution at the one or more processors, and wherein to determine the gameplay state of the gaming application, the one or more processors are further configured to:

determine, and based at least in part on the amount of usage of the one or more processors by the gaming application, the gameplay state of the gaming application.

13. The computing device of claim 11, wherein the one or more characteristics comprise graphical rendering commands invoked by the gaming application during execution at the one or more processors, and wherein to determine the gameplay state of the gaming application, the one or more processors are further configured to:

determine, based at least in part on the graphical rendering commands invoked by the gaming application, the gameplay state of the gaming application.

14. The computing device of claim 11, wherein the one or more characteristics comprise a pattern of inputs received at an input device during execution of the gaming application at the one or more processors, and wherein to determine the gameplay state of the gaming application, the one or more processors are further configured to:

determine, based at least in part on the pattern of inputs received at an input device, the gameplay state of the gaming application.

15. The computing device of claim 11, wherein the one or more characteristics comprise the image data outputted for display at the display device by the gaming application, and wherein to determine the gameplay state of the gaming application, the one or more processors are further configured to:

determine, based at least in part on the image data outputted for display at the display device, the gameplay state of the gaming application.

16. The computing device of claim 11, wherein to determine the gameplay state of the gaming application, the one or more processors are further configured to:

determine that the gameplay state of the gaming application is in one of: a gaming state or a non-gaming state, wherein the gaming application, in the gaming state, provides an interactive gameplay environment for active gameplay.

17. The computing device of claim 16, wherein to adjust the target frame rate of the image data, the one or more processors are further configured to:

in response to determining that the gameplay state of the gaming application is in the gaming state, increase the target frame rate of the image data being outputted by the gaming application.

18. The computing device of claim 16, wherein to adjust the target frame rate of the image data, the one or more processors are further configured to:

in response to determining that the gameplay state of the gaming application is in the non-gaming state, decrease the target frame rate of the image data being outputted by the gaming application.

19. A computer-readable storage medium storing instructions that, when executed, cause one or more processors of a computing device to:

determine one or more characteristics of the computing device during execution of a gaming application at the one or more processors;

determine a gameplay state of the gaming application executing at the one or more processors based at least in part on the one or more characteristics, the gameplay state comprising a gaming state or a non-gaming state;

determine that, during previous execution of the gaming application, the gaming application outputted image data at a certain frame rate without an internal temperature within an enclosure of the computing device exceeding a specified threshold temperature;

adjust, based at least in part on the gameplay state of the gaming application and on the internal temperature within the enclosure of the computing device, a target frame rate of image data outputted by the gaming application for display at a display device, including setting the target frame rate to the certain frame rate; and output, based at least in part on the adjusted target frame rate, the image data for display at the display device.

* * * * *